2,990,250
METHOD FOR OXIDIZING TRIVALENT TITANIUM IN SOLID TITANIUM OXIDE CONTAINING MATERIALS

Olav Moklebust, Homewood, Ala., Gunnar Olavesen, Fredrikstad, and Harald Bjoranesset, Hauge i Dalane, Norway, assignors to National Lead Company, New York, N.Y., a corporation of New Jersey
No Drawing. Filed Nov. 25, 1958, Ser. No. 776,198
3 Claims. (Cl. 23—202)

This invention relates to a method for effecting complete oxidation of the trivalent titanium values in titanium oxide containing materials, especially concentrates which are prepared by thermal reduction in the solid state in rotary furnaces. More specifically it relates to a method of oxidizing trivalent titanium values in titanium oxide containing materials whereby the oxidation products will be digestible in sulphuric acid.

The production of concentrates rich in titanium oxide which are suitable as a raw material in the titanium industry usually includes a thermal reduction of a titaniferous ore concentrate with a carbonaceous reducing agent, for instance coke. The reduction may for instance be carried out in an electrically heated smelting furnace and a slag rich in titanium oxide, and iron may be tapped separately. The reduction may also be carried out without melting or sintering, for instance in a rotary furnace, as described in United States Patent No. 2,778,724.

When the reduction is carried out without melting or sintering, the conditions during the reduction are selected so that a finely divided metallic iron is formed which after crushing of the reduced material, may be separated from the remaining titanium oxide concentrate by magnetic separation or classification.

In order to achieve the cleanest separation and the richest concentrates, it is important that substantially all of the iron be reduced to the metallic state. Under the highly reducing conditions which must be used to achieve this a considerable part of the titanium values in the concentrate are reduced to the trivalent state. In slags produced on a large industrial scale in electric smelting furnaces up to 25–30% of the total titanium values are present in the trivalent state. In titaniferous concentrates produced by thermal reduction in the solid state in rotary furnaces, it has been found that up to 50–80% of the total titanium values are in the trivalent state.

Most of the rich titanium oxide concentrates are used in the titanium pigment industry. In the production of titanium pigments the concentrates are digested in strong sulphuric acid whereby a digestion cake is formed which contains water-soluble titanium sulphate. The digestion cake is leached with water containing sulphuric acid and the titanium values are recovered by hydrolytic precipitation as titanium hydrate. When concentrates contain titanium in the trivalent state, the trivalent titanium will reduce the strong sulphuric acid in the digestion step, causing the evolution of sulphur dioxide and hydrogen sulphide. Apart from the fact that this represents a loss in sulphuric acid, considerable difficulties are caused in the production by the strong and unpleasant gas evolution. In addition to this the trivalent titanium ions do not hydrolize and precipitate in the hydrolytic decomposition of titanium sulphate in solution. In order to prevent the loss of the trivalent titanium values in the mother liquor it is therefore necessary to oxidize the trivalent titanium before the hydrolysis. An oxidation of trivalent titanium in titanium sulphate solutions, however, involves considerable technical and economical problems. It is therefore of great importance that titanium oxide concentrates with a high content of trivalent titanium are oxidized before the digestion with sulphuric acid.

It is known that slags produced in electric smelting furnaces and pulverized to minus 325 mesh, may be completely oxidized by direct heating to approximately 400°–600° C. in an oxidizing atmosphere. Titanium oxide concentrates produced by thermal reduction in the solid state in a rotary furnace usually, however, have in addition to a higher content of trivalent titanium a considerable smaller particle size, about 1–5 microns. Due to this they are highly pyrophoric at temperatures of about 150° C. and thereabove. They can therefore not be oxidized in the manner mentioned for slags produced in electric smelting furnaces as they in that case would ignite and glow with the result that a considerable portion of the titanium compounds would be transferred to rutile which is not digestible in sulphuric acid.

Canadian Patent No. 556,038 describes a method for oxidizing titanium oxide concentrates, the oxidation being carried out at a temperature below 100° C. in the presence of water and oxidation catalysts, and preferably in connection with a pelletizing operation. Such an oxidation will, however, not be complete as the lattice structure of the Fe-Mg-dititanates of the concentrates is retained and this lattice can only take up a certain amount of oxygen. Tests have shown that concentrates oxidized according to this procedure still contain about 20–25% of the titanium values in the trivalent state. A further oxidation of any importance will not take place until the temperature reaches about 250–300° C. The velocity of the oxidation is highly dependent upon the temperature. Most of the concentrates prepared by thermal reduction in the solid state in a rotary furnace have, however, even after a partial low temperature oxidation, been found to be pyrophoric at the temperatures which rapidly give a complete oxidation. The term "rapidly" is used in this case to indicate that the necessary time does not exceed about 30 minutes.

An object of the instant invention is to provide a process for oxidizing trivalent titanium values contained in titanium oxide materials. Another object is to provide a method for oxidation of trivalent titanium values in order to convert them to tetravalent titanium values which are amenable to digestion with strong acids, such as sulphuric acid. These and other objects will become apparent from the following description and examples.

According to the present method the titanium oxide containing material is agglomerated and subjected to a partial oxidation by oxygeneous gas in the presence of water and electrolytes at temperatures below 100° C. and thereafter treated with an oxidizing, oxygeneous gas at gradually increasing temperatures within the range of 250–400° C.

According to the invention the oxidation is carried out at gradually increasing temperatures which are sufficient to give complete oxidation at a rate which is practically feasible in an industrial process. The temperature and the amount of air is controlled in such a way that autooxidation with subsequent glowing of the material is avoided.

It has been found that the tendency of the material to ignite spontaneously is reduced with increasing degree of oxidation. By starting the oxidation at a temperature where spontaneous ignition is avoided and subsequently increasing the temperature as the oxidation goes on, it is therefore possible to carry out the complete oxidation in a relatively short time. The oxidation may on the other hand be carried out at a constant temperature, which, however, must be so low that the necessary oxidation time will be very long.

It has especially been found desirable to first subject the titanium oxide concentrates to a low temperature oxidation at a temperature below 100° C. by a process according to Canadian Patent No. 556,038 as mentioned above. When treating very finely grained concentrates produced by thermal reduction the solid state in a rotary furnace this will usually be necessary as these compounds in the reduced state, as mentioned, are pyrophoric already at a temperature of 150° C.

The final oxidation according to the invention starts at 250–300° C. and is completed between 350 and 400° C. A material oxidized in this way will consist of a mixture of anatase and a compound corresponding to Fe-Mg-dititanate. Both these compounds are easily digestible in sulphuric acid. Anatase is transformed to rutile at approximately 800° C. The oxidation may, therefore, if desired, be completed at a temperature above 400° C., but this is no advantage as the increase in temperature during the oxidation must not be faster than that which is consistent with a complete control of the process and a heating to 400° C. will therefore be sufficient.

The increase in temperature may either be continuous or step-wise and must be adjusted to the characteristics of the material which is being treated, for instance its degree of reduction, particle size and previous oxidizing treatment.

As already mentioned, the concentrates are more highly pyrophoric the smaller the particle size is. To control the reactivity it is therefore advantageous to agglomerate very finely divided concentrates before oxidation, for instance by pelletizing. After pelletizing even reduced titanium oxide concentrates having a particle size of minus 5 microns may be oxidized completely at temperatures up to 280–300° C., i.e, far above the temperature of 150° C., at which they otherwise would ignite. This temperature interval is, however, so low that the oxidation would require an excessively long time which in most cases would not be practical.

The size of the pellets should not be larger than that which is consistent with sufficient diffusion of air into the pellets to give a relatively even oxidation. It has been found that especially good results are obtained with pellets having a diameter of 3–15 mm. and preferably 6–10 mm.

The preoxidation at a temperature not exceeding 100° C. may advantageously be combined with the pelletizing of the titaniferous material.

A further advantage of pelletizing is that the material is given a form in which it is suitable for storing and transportation. By an oxidizing treatment according to the invention the mechanical strength of the pellets is moreover increased.

An essential feature of the present process is a close control of the heat liberated in the oxidation in order to avoid an undesired increase in temperature and possible glowing of the material. The liberation of heat may be limited sufficiently by maintaining a relatively low temperature which, however, gives a too low rate of oxidation. It is further possible to limit the liberation of heat by limiting the amount of oxidizing gas which is introduced. This may be done in a suitable furnace with direct or indirect heating, for instance a rotary furnace, a multiple-hearth furnace or a tunnel kiln. This method, will, however, also give a relatively low rate of oxidation.

It has, however, been found that a satisfactory control of the temperature of the material may be obtained by removing the liberated heat of oxidation by means of the hot oxidizing gas itself. The heating of the material is then only carried out by means of hot oxidizing gas which is passed through the layer of titaniferous material in such an amount that the entire heat of oxidation is substantially instantly removed. Under these conditions the temperature of the titaniferous material will not differ greatly from the temperature of the introduced gas. The amount of heating gas must in each case be adjusted by trial and simultaneously the temperature must be fixed, taking into consideration the maximum amount of gas with which it will be practical and economical to operate.

In such a process it is necessary to employ agglomerated, for instance pelletized, material. A suitable pellet size has been indicated above. In addition to the ability of the pellets to permit diffusion of the oxidizing gas, the ability of the pellets to give up the liberated heat of oxidation to the surrounding gas must be taken into consideration. The pellets should, therefore, not be larger than indicated as this may lead to internal overheating, with subsequent poor digestion yields.

The oxidation according to the above mentioned principle may be carried out in a heating apparatus where the material is placed in moveable or stationary suction boxes or on a moveable wire screen belt or the like. The warm oxidizing gas is sucked through the layer of pellets by means of one or more fans and must subsequently pass through different temperature zones, in principle in counter-current to the pellets. The finished oxidized material is cooled by means of air which subsequently is introduced into the heating zones as air of combustion and/or for diluting purposes.

The following examples are given for the sake of illustration, but they should not be considered as a limitation of the invention.

*Example I*

A titanium oxide concentrate having an average particle size of minus 5 microns and a titanium oxide content corresponding to 80% $TiO_2$ and with 55% of the total titanium values in the trivalent state, was rolled to pellets having a diameter of 8–10 mm., dilute sulphuric acid (1 part of concentrated sulphuric acid to 20 parts of water) being added in the pelletizing. The pellets were treated with air and the temperature rose to a maximum of 83° C. after 6 minutes. After 10 minutes the content of trivalent titanium values in the pellets had been reduced to 28% of the total titanium values. The pellets were then placed in a 8 cm. deep layer on a stationary grate in a heat hardening furnace. A mixture of combustion gases and air was introduced at the bottom of the furnace and drawn through the pellet layer by induced draft applied to the top of the furnace. The temperature of the introduced gas was held at 290° C.

Analyses of the pellets showed the following course of oxidation:

| Time of oxidation, hours: | Ratio of $Ti^{+++}$ to total Ti, percent |
|---|---|
| 1 | 14.9 |
| 2 | 9.5 |
| 4 | 4.6 |
| 6 | 2.8 |
| 10 | 0.0 |

There was no increase of temperature in the material.

For the sake of comparison the same starting material was placed in a furnace at a temperature of 330° C. at which temperature the material started to glow.

*Example II*

A test was carried out in the same way as in Example I, with the exception that the temperature was maintained as follows:

At 270° C. for 5 minutes
At 300° C. for 10 minutes
At 330° C. for 10 minutes
At 360° C. for 20 minutes The gas was sucked through the furnace at a rate of 25 cm./sec. (calculated at normal temperature and pressure).

After oxidation the amount of trivalent titanium values had been reduced to 2% of the total titanium values.

The oxidized concentrate was digested with sulphuric acid in a thermoflask according to standard laboratory methods. The results showed that 96.4% of the $TiO_2$ was acid soluble.

In a comparison test the temperature was raised from 300° C. to 340° C. instead of to 330° C. The material then started to glow on account of too much heat being liberated by the oxidation. Digestion tests, as above, showed only 52% acid soluble $TiO_2$.

In still another comparison test the temperature after 5 minutes at 300° C. was raised to 330° C. Also in this case the material commenced to glow. The rate at which the temperature was increased was therefore too high. Digestion tests showed 45% acid soluble $TiO_2$.

*Example III*

A test was carried out in the same way as in Example II, but the amount of introduced oxidizing gas was increased to twice the amount, the gas velocity being 50 cm./sec., and the temperature was controlled as follows:

270° C. for 5 minutes
310° C. for 3 minutes
355° C. for 4 minutes
400° C. for 6 minutes The difference between the temperature of the material under treatment and the temperature of the introduced gas did not exceed 10° C. After the oxidation was completed the total amount of trivalent titanium values had been transformed to the tetravalent state.

Digestion of the oxidized material in a thermo-flask, as in Example II, showed 97.0% acid soluble $TiO_2$.

The test shows that the temperature may be higher and may be increased more rapidly when an increased amount of heating gas is employed so that the heat liberated in the oxidation may be removed more rapidly. Measurement of the amount of gas in Example III, however, showed that it could not be increased substantially more in view of the capacities of the fans and the heat economy involved on an industrial scale.

We claim:

1. Method for oxidizing trivalent titanium values in finely-divided titanium oxide materials, having an initial particle size of between about one and about five microns, comprising agglomerating and partially oxidizing said titanium oxide materials with oxygen-containing gas in the presence of water and an electrolyte at a temperature below 100° C., and thereafter completing the oxidation by passing a stream of heated oxygen-containing gas through a layer of the materials, the gas so employed being heated to temperatures within the range from about 250° C. to about 400° C., the first amounts of gas so employed having temperatures in the lower portion of said range and subsequent amounts having increasing temperatures approaching the upper portion of said range, the oxygen-containing gas being employed at all times in amount sufficient to remove the liberated heat of oxidation by passage away from the materials, thereby avoiding any undesirable rise in temperature of the titanium dioxide materials.

2. Method according to claim 1 wherein the titanium oxide materials are agglomerated in the form of pellets having a diameter of 3–15 mm.

3. Method according to claim 1 wherein the oxidation is completed at a temperature in the range of about 350° C. to about 400° C.

References Cited in the file of this patent

UNITED STATES PATENTS

| | | |
|---|---|---|
| 2,125,340 | Heiger | Aug. 2, 1938 |
| 2,589,909 | Weikel | Mar. 18, 1952 |
| 2,794,702 | Allan et al. | June 4, 1957 |

FOREIGN PATENTS

| | | |
|---|---|---|
| 89,985 | Norway | Sept. 16, 1957 |
| 556,038 | Canada | Apr. 15, 1958 |